(12) United States Patent
Theisen et al.

(10) Patent No.: US 7,469,924 B2
(45) Date of Patent: Dec. 30, 2008

(54) APPARATUS FOR PROTECTING A VEHICLE OCCUPANT

(75) Inventors: Marc Theisen, Ludwigsburg (DE);
Frank Mack, Stuttgart (DE); Thomas Lich, Schwaikheim (DE); Reiner Marchthaler, Gingen (DE); Michael Roelleke, Leonberg-Hoefingen (DE)

(73) Assignee: Robert Bosch GmbH, Stuttgart (DE)

( * ) Notice: Subject to any disclaimer, the term of this patent is extended or adjusted under 35 U.S.C. 154(b) by 473 days.

(21) Appl. No.: 10/530,113

(22) PCT Filed: May 30, 2003

(86) PCT No.: PCT/DE03/01772

§ 371 (c)(1),
(2), (4) Date: Sep. 6, 2005

(87) PCT Pub. No.: WO2004/030998

PCT Pub. Date: Apr. 15, 2004

(65) Prior Publication Data

US 2006/0097496 A1    May 11, 2006

(30) Foreign Application Priority Data

Oct. 2, 2002   (DE) ............................ 102 46 055

(51) Int. Cl.
*B60R 21/015* (2006.01)
(52) U.S. Cl. ............................ 280/735; 701/45; 701/47
(58) Field of Classification Search ................. 280/735; 701/45, 47

See application file for complete search history.

(56) References Cited

U.S. PATENT DOCUMENTS

| 4,625,329 | A | * | 11/1986 | Ishikawa et al. | ............ 382/104 |
|---|---|---|---|---|---|
| 4,985,835 | A | * | 1/1991 | Sterler et al. | .................. 701/46 |
| 5,413,378 | A | * | 5/1995 | Steffens et al. | .............. 280/735 |
| 5,540,461 | A | * | 7/1996 | Nitschke et al. | ............. 280/735 |
| 5,673,932 | A | * | 10/1997 | Nitschke et al. | ............. 280/735 |
| 5,735,574 | A | * | 4/1998 | Serber | ...................... 297/284.4 |
| 6,005,958 | A | * | 12/1999 | Farmer et al. | ............... 382/103 |
| 6,018,693 | A | * | 1/2000 | Blackburn et al. | ........... 701/45 |
| 6,169,945 | B1 | | 1/2001 | Bachmaier | |
| 6,188,940 | B1 | | 2/2001 | Blackburn et al. | |
| 6,213,510 | B1 | * | 4/2001 | Suyama | ..................... 280/805 |
| 6,331,014 | B1 | * | 12/2001 | Breed | ...................... 280/730.1 |
| 6,341,252 | B1 | * | 1/2002 | Foo et al. | ....................... 701/45 |
| 6,431,593 | B1 | * | 8/2002 | Cooper et al. | ............... 280/735 |
| 6,520,535 | B1 | * | 2/2003 | Stanley et al. | ............... 280/735 |
| 6,662,093 | B2 | * | 12/2003 | Farmer | ........................ 701/45 |

(Continued)

FOREIGN PATENT DOCUMENTS

DE    38 09 074    10/1989

(Continued)

*Primary Examiner*—Paul N. Dickson
*Assistant Examiner*—Timothy Wilhelm
(74) *Attorney, Agent, or Firm*—Kenyon & Kenyon LLP

(57) ABSTRACT

An apparatus for protecting a vehicle occupant that triggers a restraint means as a function of the vehicle occupant's motion in the context of an accident. The motion is predicted in that by using an occupant detection system and an impact sensor system, a height of the center of mass of the vehicle occupant and a force action on the vehicle occupant are determined, and the motion of the vehicle occupant is thereby predicted.

7 Claims, 3 Drawing Sheets

U.S. PATENT DOCUMENTS

| | | | |
|---|---|---|---|
| 6,774,810 B2 * | 8/2004 | DeLine et al. | 340/815.4 |
| 6,853,898 B2 * | 2/2005 | Farmer et al. | 701/45 |
| 6,988,413 B1 * | 1/2006 | Lichtinger et al. | 73/768 |
| 2001/0026162 A1 | 10/2001 | Fukui et al. | |
| 2001/0033072 A1 * | 10/2001 | Kumagai et al. | 280/730.1 |

FOREIGN PATENT DOCUMENTS

| | | |
|---|---|---|
| DE | 41 12 579 | 10/1991 |
| DE | 42 12 421 | 10/1993 |
| DE | 197 24 101 | 12/1998 |
| EP | 1 000 819 | 5/2000 |
| LU | 90 361 | 9/2000 |

* cited by examiner

APPARATUS FOR PROTECTING A VEHICLE OCCUPANT

FIELD OF THE INVENTION

The present invention relates to an apparatus for protecting a vehicle occupant.

BACKGROUND INFORMATION

German Patent No. DE 42 124 21 describes an apparatus for protecting the vehicle occupant triggers restraint means as a function of the occupant's estimated motion.

SUMMARY

An example apparatus according to the present invention for protecting a vehicle occupant may have the advantage, as compared with the above, that a more exact prediction of the vehicle occupant's motion is possible. This ultimately results in more optimal triggering of the restraint means. This advantage is achieved by the fact that the occupant detection system is configured in such a way that it determines the height of the traveling center of mass of the vehicle occupant, and from that parameter an accurate estimate can then be made regarding the other body data of the vehicle occupant. This results in an accurate prediction as to where the vehicle occupant will be located as a function of the impact signals.

It is particularly advantageous that the occupant detection system is embodied to determine the seat position of the vehicle occupant, the seat position being taken into account in the motion prediction. If the exact seat position is available, a more accurate prediction of the vehicle occupant's motion is then possible in combination with knowledge of the center of mass, which provides information regarding the vehicle occupant's posture.

It is additionally advantageous if the apparatus is connectable to a sensor system for sensing a belt pull-out length, the apparatus taking the belt pull-out length into account in the motion prediction. The belt pull-out length provides information as to how far forward the respective occupant is leaning. This, too, may be an important parameter in determining the vehicle occupant's motion. If the vehicle occupant is already leaning far forward upon impact, he will then be thrown even farther forward by the motion of the impact, so that triggering of a front airbag may in this case be too hazardous because triggering would then strike against the vehicle occupant's head with full force.

It is additionally advantageous if the apparatus determines an upper-body size with the aid of the height of the center of mass and the seat position, and takes the upper-body size into account in the motion prediction. The upper-body size provides an important indication as to how the vehicle occupant will move under the influence of the impact. Since the upper body is rotated principally about the hip, i.e., about the hip joint, the length of the upper body allows an estimate as to how far the vehicle occupant's head will move toward the dashboard. This, too, may be an important parameter for accurately predicting the vehicle occupant's motion.

It is also advantageous if from the forward displacement and the initial seat position, the current seat position during the crash is determined.

Lastly, it is also advantageous if the apparatus has a memory that encompasses a relationship between the mass of the vehicle occupant and further anthropometric data. From the mass, the determination of the center of mass, and other directly measured variables, it is possible to create an accurate picture of the vehicle occupant's body. This is based on the fact that given a certain mass and a certain center of mass, it is possible by way of a statistical relationship to draw a conclusion as to the entire body of the person in question. A certain mass and a certain center of mass are associated in highly correlated fashion with a certain body size and also certain body dimensions of the vehicle occupant's individual limbs. This, too, results in a very accurate prediction of the respective vehicle occupant's motion in the event of an impact.

BRIEF DESCRIPTION OF THE DRAWINGS

Exemplary embodiments of the present invention are depicted in the drawings and will be explained in more detail in the description below.

DETAILED DESCRIPTION OF EXAMPLE EMBODIMENTS

Figure 1:
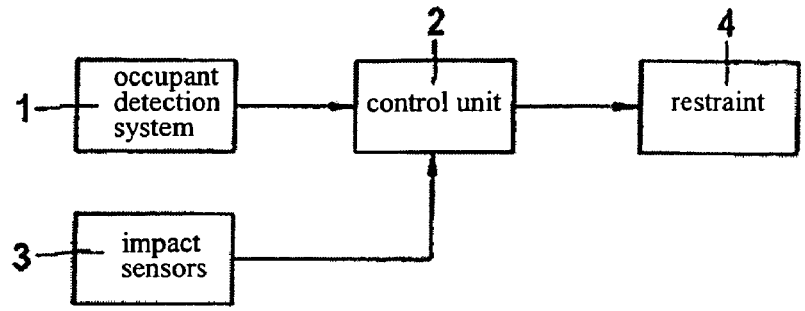
FIG. 1 is a block diagram of the apparatus according to the present invention.

In the context of the introduction of passenger airbags, the need has arisen, for reasons having to do with safety and insurance, to detect occupancy of a passenger seat by a person. In the event of an accident with an unoccupied passenger seat there is no occupant to protect, and unnecessary repair costs would arise if the airbag deployed.

Technical solutions exist for seat occupancy detection and for automatic child-seat detection. With the "smart bags" that are about to be introduced, greater demands are necessary in terms of detecting occupancy of the automobile seat. The smart bag is intended to be adaptive to persons and situations in terms of its inflation behavior.

The intention is thus for an intelligent seat occupancy detection system to exist. Triggering of the passenger airbag should be prevented if, in certain situations, deployment of the airbag would work to the occupant's disadvantage. This is the case, for example, if a child is sitting in the passenger seat or if a person is too close to the dashboard.

According to the present invention, an apparatus for protecting a vehicle occupant is proposed that calculates an individual triggering strategy in the vehicle and determines an occupant-position-dependent triggering time of the airbag in the event of an accident, or prevents triggering if the occupant is too close to the dashboard. Presented for this purpose is a method with which, with the aid of a variety of sensors, the occupant's forward displacement can be predicted.

In the simplest case, the occupant sensing system—for example an absolute weight measurement system, a sensor mat, a video sensing system, or an ultrasound sensing system—usually yields four signals regarding the absolute weight measurement, which supply the absolute weight (in kg) from each sensor. This information can be employed, in addition to the determination of the center of gravity, for position detection. Other seat-based methods, such as the seat mat, can optionally supply an entire pressure profile. Irrespective of the sensor system, however, it is possible by way of the change in motion and the position of the center of gravity in the X and Y directions to determine the height of its center of mass. In other words, information exists regarding the occupant's center of gravity in the X, Y, and Z directions.

Proceeding therefrom, information is additionally available regarding the occupant's position. Since certain ambiguities in the center of gravity make it impossible to distinguish unequivocally whether the person is sitting on the seat or may be leaning extremely far forward, the belt pull-out length and the position of the seat relative to the vehicle, for example, can also be incorporated as correction variables. The position of the seat can be sensed, for example, via a seat position sensor, or the information is available on the CAN bus. The latter is usually the case with electrically adjustable seats. The occupant's position while traveling is thus available.

The apparatus according to the present invention is furthermore capable, based on knowledge of the occupant's position on the respective seats (driver, front passenger, and rear passengers), of determining or predicting the trajectory and individually adapting the restraint means on the basis of the respective trajectory. A determination of the trajectory of each individual occupant makes it possible to adapt the restraint means individually as a function of the trajectory and the particular accident situation. Optimum protection of the occupant in the event of an accident is thus obtained. The current position of each occupant is sensed with the aid of a sensor, for example a video camera or weight-based systems. The forces acting on the occupants in the X and/or Y and/or Z directions are also sensed, for example by way of acceleration sensors. The individual trajectory can be calculated or predicted based on a knowledge of the forces acting on the occupant and of the current position of the occupant. The relative velocity with respect to the vehicle and relative acceleration with respect to the vehicle, derived from the change in the occupant's position over time, can also, for example, be used to calculate the occupant trajectory. With this trajectory calculated individually for each occupant as a function of the particular accident situation, the restraint means are individually and optimally triggered. With a knowledge of the location of the person's head or upper body at each specific moment during an accident, it is possible to use the restraint means optimally in order to protect the person. That includes an optimum firing time and a corresponding inflation characteristic in the case of an airbag.

According to the present application, the term "motion" may thus not only be understood as, for example, the forward displacement of the vehicle occupant, but also as the trajectory, i.e., the motion sequence of the vehicle occupant in response to forces that occur in an accident. FIG. 1 is a block diagram showing an example apparatus according to the present invention. An occupant detection system 1 is connected via a data output to a control unit 2 for restraint means. An impact sensor system 3 is connected to control unit 2 via a second data input. Control unit 2 is connected via a data output to restraint means 4.

Occupant detection system 1 is in this case, in particular, weight-based, i.e., pressure sensors in the seat cushion or force gauging pins on the seat can be used, or wave-based occupant detection means such as video or ultrasound can be used. This occupant detection system allows determination of the seat position and characterization of the person, i.e., an occupant classification. The occupant classification is performed predominantly on the basis of weight, different classes being defined for which a different inflation behavior of the airbag is applied. For persons under 45 kg, for example, the use of airbags is not indicated in order to avoid a risk of injury in such a case. Impact sensor system 3 is usually embodied as an inertial sensor system. This encompasses, in particular, acceleration sensors that are disposed in the X, Y and possibly also Z direction in the vehicle. This sensor system can be placed centrally in control unit 2 itself, but in addition can also be placed remotely in satellite sensors, e.g., in the B-pillar and/or as up-front sensors that are mounted in the vicinity of the vehicle's radiator. Impact sensors 3 also include a pre-crash sensor system, i.e., radar or video or ultrasound, which enables monitoring of the surroundings. With these sensors it is possible to determine the impact velocity or the relative velocity between the vehicle and the impact object. The impact sensors also include deformation sensors or indirect deformation sensors such as pressure and temperature sensors. Control unit 2 is usually mounted on the vehicle tunnel, but can also be disposed at other locations in the vehicle. As discussed above, control unit 2 also encompasses its own sensor system that is used either for impact detection and assessment, or only for plausibility testing of signals from remote impact sensors. A combination of plausibility testing and impact detection is also possible for a sensor system in control unit 2. Restraint means 4 are usually airbags, but restraint means 4 can also be understood as belt tensioners, active seats, and/or a roll bar.

Figure 2:
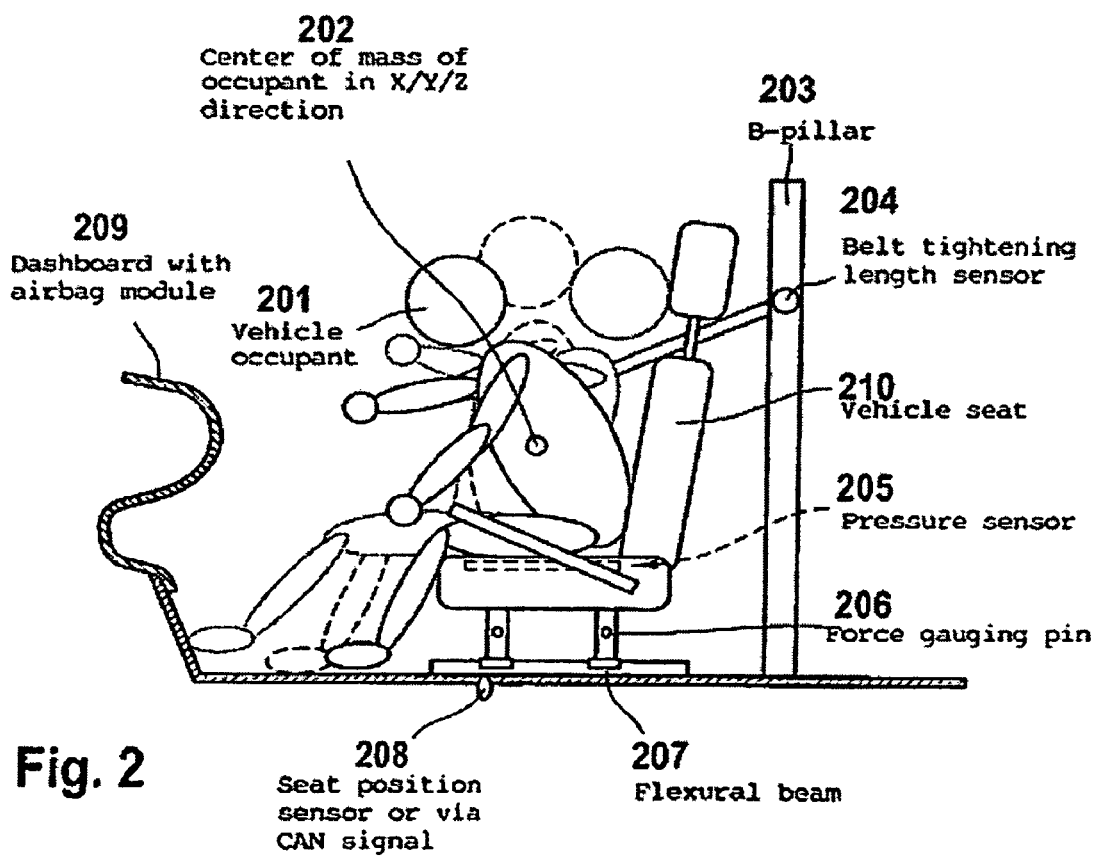
FIG. 2 schematically depicts the apparatus according to the present invention.

FIG. 2 schematically depicts an example apparatus according to the present invention. A person 201 is depicted here as a vehicle occupant sitting on a vehicle seat 210. In particular, the person is depicted here three times in order to represent the sequence during a forward displacement in response to an impact. Person 201 has a center of mass 202 that is determined by the occupant detection system. A pressure sensor 205, e.g. a seat mat, is installed in the seat cushion. Force gauging pins 206 can be disposed in the supports of seat 210 in order to determine the weight of vehicle occupant 201. Force gauging pins 206 also make possible determination of a weight distribution, and thus an analysis of the seat position. It is furthermore possible to provide a seat position sensor 208 which detects the point at which seat 210 is located. This can also be retrieved by way of an identifying signal if an electric seat adjustment system is present. Person 201 is protected by a seatbelt, on which a belt pull-out length sensor 204 is present in order to measure the forward displacement of person 201. The belt pull-out length sensor is disposed in B-pillar 203. In an accident, person 201 is usually displaced forward, i.e., toward the dashboard having airbag module 209.

The height of center of gravity 202 of a seated person 201 is located at approximately 25 to 30% of his or her upper-body length. Since the height of center of gravity 202 is known, the upper-body length can be inferred, for example, using the formula (upper-body length in cm)=(center of gravity)/0.275. A memory of control unit 2 can contain a reference table by which different body masses, and masses for individual body parts, can be ascertained from the measured variables. If a table of this kind for different body types is stored in the memory, it is then possible, proceeding from the measured mass of the occupant, to ascertain the table most relevant to him in terms of mass and the height of the center of mass. Alternatively, the reference table can be a database designed for human beings, containing mass, body size, mass of the center of gravity, as well as anthropometric data such as the body dimensions of individual limbs of different persons. Not only can plausibility values be derived from this, but the head size can also be extracted therefrom. Plausibility could be tested, for example, by the fact that the calculated upper-body length should correspond to the value in the reference table within a certain tolerance range. If so, the head size can be assumed with a certain probability, and it is corrected if applicable. The calculation of upper-body length and head size thus provides an indication of the head's current position in the vehicle. In the event of a crash, a double integration of the acceleration signal is performed by the acceleration sensor or the pre-crash sensor. That yields an indication of the distance traveled. From the current position of the occupant and the distance signal, it is possible to make an estimate of where the occupant will be at time T.

This method therefore makes it possible to determine the occupant's initial position before the crash. Starting at the moment of crash contact, the acceleration signal measured in the central control unit is doubly integrated. The value of the double integral reflects the forward displacement of an unrestrained mass, and therefore corresponds (to a first approximation) to the occupant's forward displacement. The value of this second integral is compared with a threshold that depends both on the impact velocity and on the occupant's seat position prior to the crash. It is thus possible, for example, not to fire the airbag if the occupant is located at or close to the dashboard, to fire the airbag earlier if the occupant is leaning forward in terms of the normal position, or to fire the airbag later if the occupant is leaning farther back than normal. It is thus possible to control the triggering decision. That triggering decision can encompass, for example, the decision as to whether to fire the restraint means, and if so at what level and at what point in time. Alternatively, other models for forward displacement calculation can be used; the approach described above using the double integral is merely one example of a calculation.

Figure 3:
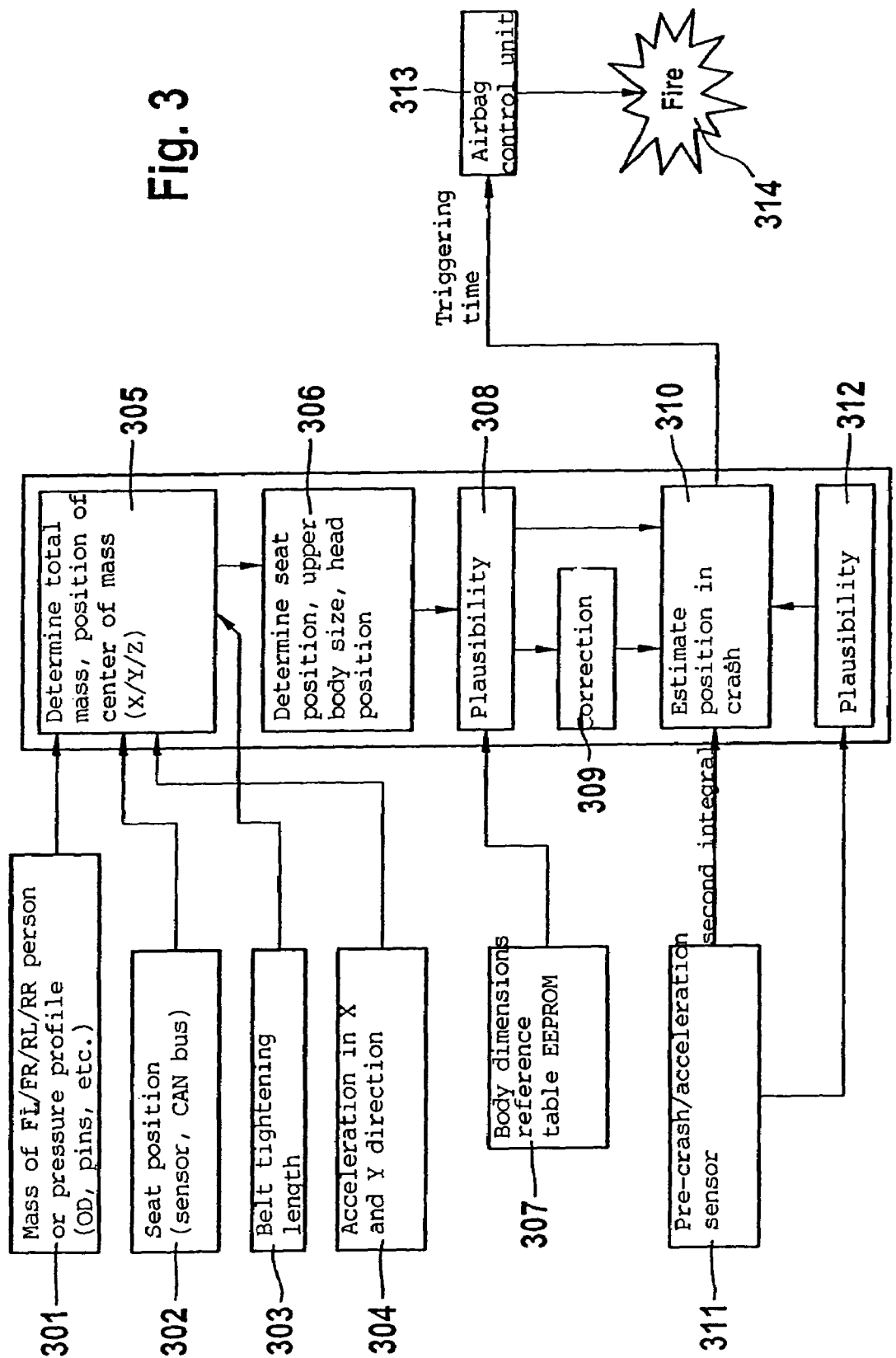
FIG. 3 is a flow chart.

FIG. 3 illustrates execution of an example method according to the present invention. In method step 301 the mass of the person is determined via occupant detection system 1. In method step 302 the seat position of vehicle seat 210 is determined. In method step 303 the belt pull-out length is determined with belt pull-out length sensor 204. In method step 304 the acceleration in the X and Y directions is determined. From these parameters, the overall mass and the position of the center of mass are determined in method step 305. From that, in method step 306, the positions of the seat, upper body, and head are determined. In method step 308 a plausibility test is performed, specifically using stored body dimensions or a reference table from method step 307. These data can be stored, for example, in an EEPROM. In method step 309 a correction is performed if applicable. In method step 310 the position in the event of a crash is estimated, based on the current seat position and the forward displacement that was determined in method step 311 from the signal of the pre-crash sensor or acceleration sensor. A plausibility test is also performed in method step 312 by impact sensor system 3, and is conveyed to method step 310. If the plausibility test was passed, the triggering time for the restraint means is then determined by airbag control unit 313, and in method step 314 a corresponding triggering of the selected restraint means 4 is performed.

Figure 4:
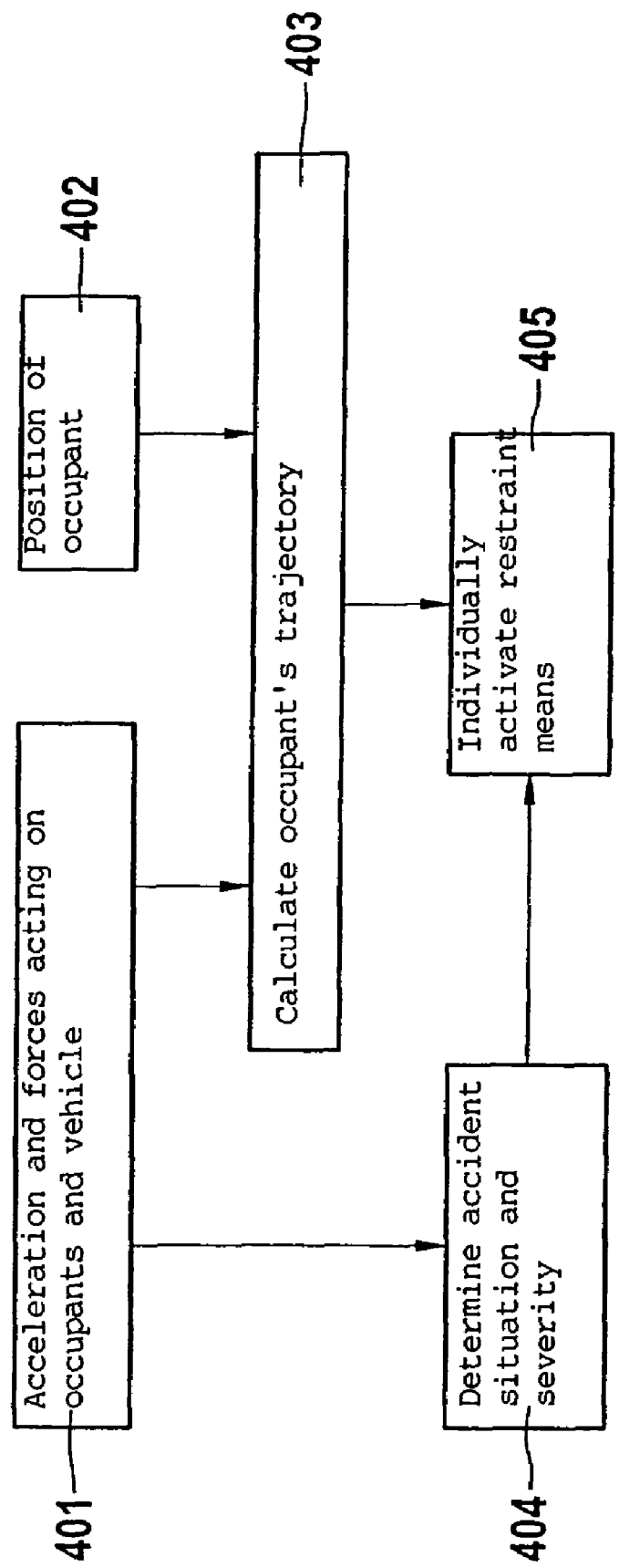
FIG. 4 is a further flow chart.

FIG. 4 shows, in a flow chart, the steps performed in order to determine the trajectory of the occupant, i.e., of the moving occupant. In method step 401 the acceleration or the forces acting on the occupant and the motor vehicle are determined by sensor system 3. In method step 402 the occupant's position is determined with the aid of occupant detection system 1. From that, in method step 403, the occupant's trajectory is predicted. From the acceleration from method step 401, in method step 404 the accident situation or accident severity is determined. From the occupant's trajectory and the accident severity, in method step 405 an individual activation of restraint means 4 is performed.

What is claimed is:

1. An apparatus for protecting a vehicle occupant, comprising:
   an arrangement configured to trigger restraint means as a function of a motion of the vehicle occupant, the arrangement configured to determine, using an occupant detection system and an impact sensor, a height of a center of mass of the vehicle occupant and a force action on the vehicle occupant, and thereby predicts the motion of the vehicle occupant;
   wherein the occupant detection system is configured to determine a seat position of the vehicle occupant, the arrangement taking the seat position into account in the prediction of the motion;
   and wherein the arrangement is configured to determine an upper-body size using the height of the center of mass and the seat position, and takes the upper-body size into account in the prediction of the motion.

2. The apparatus as recited claim 1, wherein the apparatus is connectable to a sensor system for sensing a belt pull-out length, the arrangement taking the belt pull-out length into account in the prediction of the motion.

3. The apparatus as recited in claim 1, wherein the arrangement includes a memory that stores a relationship between a mass of the vehicle occupant and further anthropometric data.

4. The apparatus as recited in claim 1, wherein the arrangement determines the forward displacement by using the impact sensor system, and determines a current seat position during the crash using an initial position.

5. The apparatus as recited claim 1, wherein the apparatus is connectable to a sensor system for sensing a belt pull-out length, the arrangement taking the belt pull-out length into account in the prediction of the motion, and wherein the arrangement includes a memory that stores a relationship between a mass of the vehicle occupant and further anthropometric data.

6. The apparatus as recited in claim 5, wherein the arrangement determines the forward displacement by using the impact sensor system, and determines a current seat position during the crash using an initial position.

7. The apparatus as recited in claim 1, wherein the arrangement includes a memory that stores a relationship between a mass of the vehicle occupant and further anthropometric data, and wherein the arrangement determines the forward displacement by using the impact sensor system, and determines a current seat position during the crash using an initial position.

* * * * *